United States Patent

Tiedtke et al.

(10) Patent No.: US 6,406,614 B1
(45) Date of Patent: Jun. 18, 2002

(54) METHOD FOR ZEOLITE PLATINIZATION

(75) Inventors: Darin B. Tiedtke; Tin-Tack Peter Cheung, both of Bartlesville; Daniel Resasco; Gary Jacobs, both of Norman, all of OK (US)

(73) Assignee: Phillips Petroleum Company, Bartlesville, OK (US)

( * ) Notice: Subject to any disclaimer, the term of this patent is extended or adjusted under 35 U.S.C. 154(b) by 0 days.

(21) Appl. No.: 09/469,837

(22) Filed: Dec. 22, 1999

(51) Int. Cl.⁷ ................. C10G 35/085; C07C 5/32; B01J 29/068
(52) U.S. Cl. ............... 208/138; 585/419; 585/440; 585/444; 502/66; 502/74
(58) Field of Search ............... 502/66, 74, 334; 208/138; 585/419, 440, 444

(56) References Cited

U.S. PATENT DOCUMENTS

| | | | |
|---|---|---|---|
| 4,020,012 A | 4/1977 | Miura et al. | 252/441 |
| 4,049,581 A | 9/1977 | Itoh et al. | 252/466 |
| 4,151,115 A | 4/1979 | Eberly, Jr. | 252/434 |
| 4,213,881 A | 7/1980 | Eberly, Jr. | 252/436 |
| 4,219,447 A | 8/1980 | Wheelock | 252/466 |
| 4,244,809 A | 1/1981 | Wheelock | 208/108 |
| 4,282,086 A | 8/1981 | Eberly, Jr. | 208/139 |
| 4,431,574 A * | 2/1984 | Bournonville et al. | 502/261 |
| 4,568,656 A | 2/1986 | Poeppelmeier et al. | 502/74 |
| 4,737,262 A | 4/1988 | Franck et al. | 208/65 |
| 4,824,816 A | 4/1989 | Trowbridge et al. | 502/66 |
| 4,839,320 A | 6/1989 | Trowbridge et al. | 502/66 |
| 4,894,214 A * | 1/1990 | Verduijn et al. | 423/328 |
| 4,912,072 A | 3/1990 | Mallouk et al. | 502/74 |
| 4,992,158 A * | 2/1991 | Schweizer | 208/65 |
| 5,073,652 A | 12/1991 | Katsuno et al. | 585/419 |
| 5,456,822 A | 10/1995 | Marcilly et al. | 208/136 |
| 5,780,701 A * | 7/1998 | Kaska et al. | 585/654 |
| 5,864,051 A * | 1/1999 | Iwasawa et al. | 568/479 |
| 5,898,011 A * | 4/1999 | Wu et al. | 502/60 |
| 6,063,724 A * | 5/2000 | Resasco et al. | 502/73 |
| 6,083,867 A * | 7/2000 | Wu et al. | 502/241 |

* cited by examiner

Primary Examiner—Bekir L. Yildirim
(74) Attorney, Agent, or Firm—Charles W. Stewar

(57) ABSTRACT

A catalyst composition containing a zeolite and platinum, and a method of preparing such catalyst composition, are disclosed. The thus-obtained catalyst composition is employed in the conversion of a hydrocarbon to aromatics.

29 Claims, 6 Drawing Sheets

Inventive Run 1--light naphtha feed

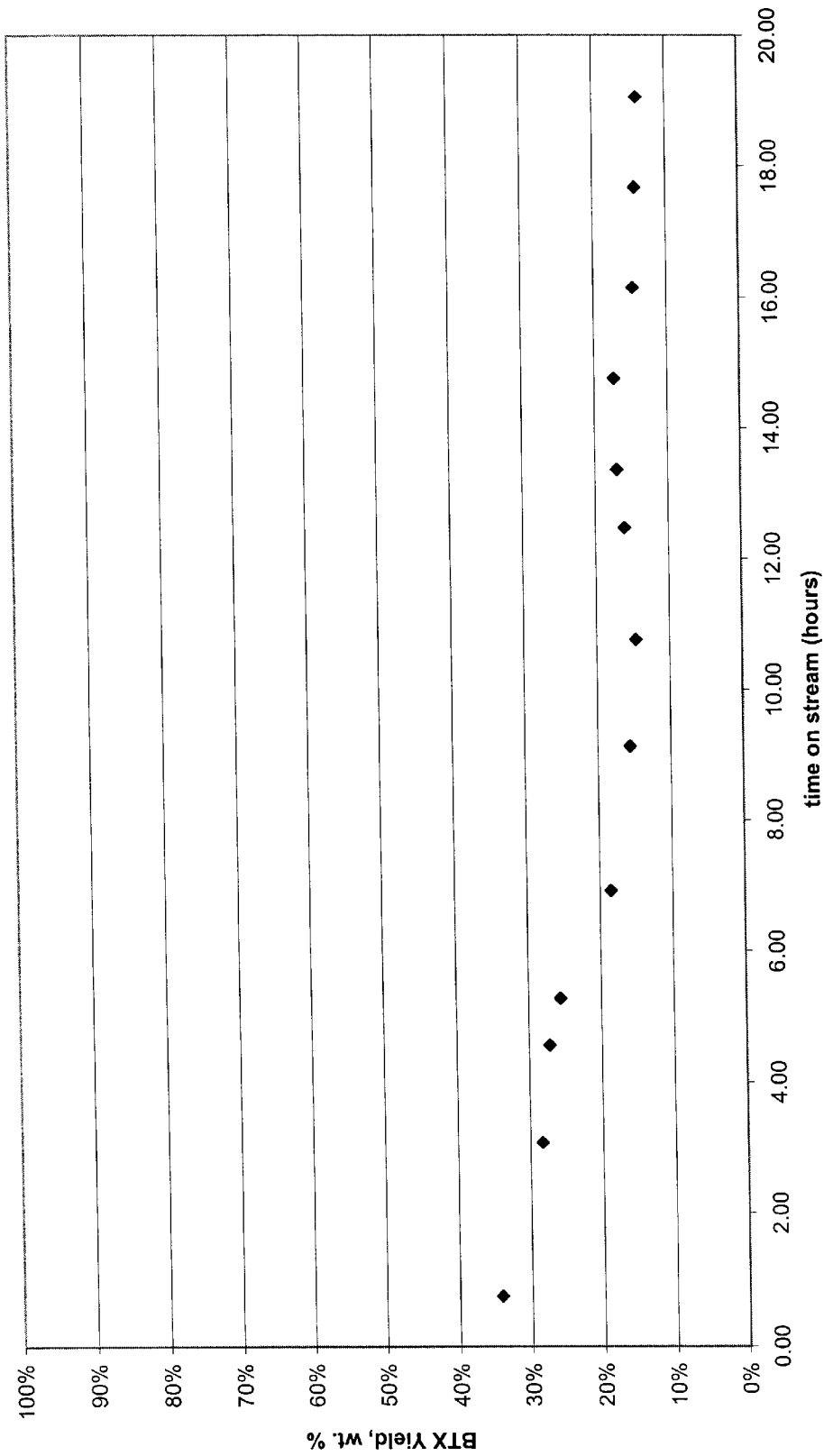

METHOD FOR ZEOLITE PLATINIZATION

BACKGROUND OF THE INVENTION

The present invention relates to catalyst compositions useful in hydrocarbon upgrading processes and to methods for their production and use. In another aspect, this invention relates to processes for converting hydrocarbons to $C_6$–$C_8$ aromatics by contact with a zeolite platinized by the inventive method.

It is known in the art to incorporate platinum into a zeolite to form a catalyst useful in hydrocarbon conversion processes such as conversion to aromatics. Such methods include incipient wetness impregnation of a zeolite using a platinum salt in water. One problem with this method is that the resulting catalyst suffers from low conversions of hydrocarbons to aromatics. Another method is the vapor phase impregnation of a zeolite with platinum (II) acetylacetonate. The resulting catalyst from this method produces high conversions, but, is prohibitively expensive in a commercial operation. Therefore, development of an economical method for producing a platinized zeolite catalyst which demonstrates high hydrocarbon conversions to aromatics when used in a hydrocarbon conversion process would be desirable.

SUMMARY OF THE INVENTION

It is an object of this invention to provide an improved process of increased efficiency for the conversion of hydrocarbons in which the yield of aromatics is increased.

A yet further object of this invention is to provide an improved zeolite material which when used in the conversion of hydrocarbons results in increased aromatics yield.

Another further object of this invention is to provide an improved method of increased efficiency for making an improved zeolite material having such desirable properties as providing for increased aromatics yield when used in the conversion of hydrocarbons.

The inventive catalyst composition comprises, consists of, or consists essentially of a zeolite and platinum. The inventive catalyst composition can be prepared by the steps of:

contacting a zeolite with a solution comprising an organic solvent and an organo-platinum compound thereby forming a mixture comprising the solution and a treated zeolite having externally and internally associated organo-platinum compound;

removing at least a substantial portion of the organic solvent from the mixture leaving the treated zeolite; and calcining the treated zeolite thereby forming a calcined-treated zeolite.

The inventive catalyst composition can be used in the conversion of a hydrocarbon or hydrocarbon mixture to aromatics by contacting, under conversion conditions, a hydrocarbon feedstock with the inventive catalyst composition.

Other objects and advantages of the invention will become apparent from the detailed description and the appended claims.

BRIEF DESCRIPTION OF THE DRAWINGS

FIGS. 1–6 illustrate the BTX yield in weight % vs. time on stream for the conversion of hydrocarbons when contacted with various platinum-containing catalysts including the inventive catalyst.

DETAILED DESCRIPTION OF THE INVENTION

Figure 1:
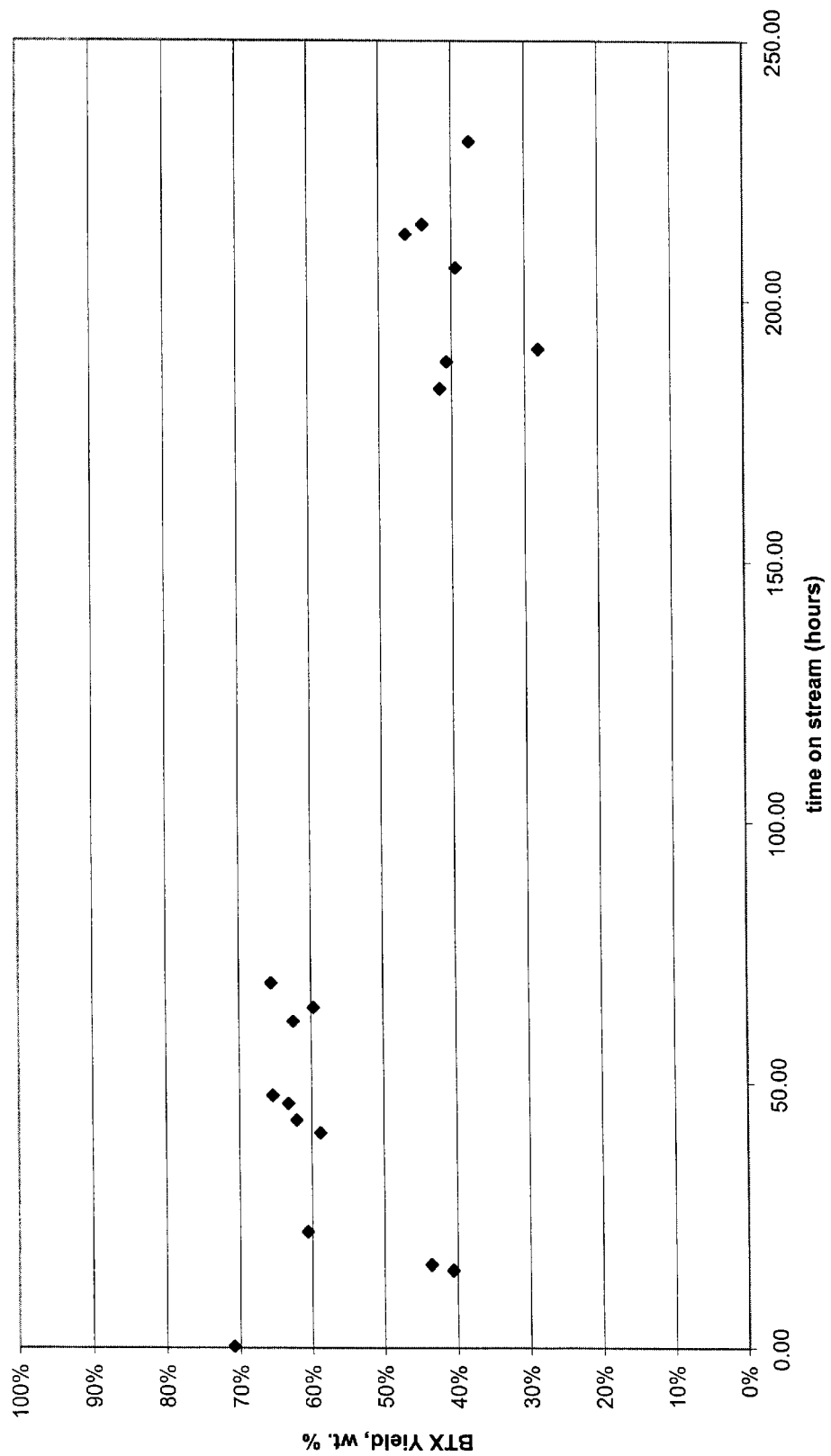

The zeolite material used in preparing the inventive catalyst composition can be any L type zeolite that is effective in the conversion of non-aromatic aromatic hydrocarbons to aromatic hydrocarbons when contacted under suitable reaction conditions with non-aromatic hydrocarbons. The presently more preferred zeolite is the K (potassium) form of L type zeolite (that is, KL zeolite).

The inventive composition is a material that comprises, consists of, or consists essentially of a zeolite, as described above, and platinum.

The zeolite is contacted with a solution comprising, consisting of, or consisting essentially of an organo-platinum compound thereby forming a mixture comprising a treated zeolite and the solution. The solution can also contain any suitable solvent capable of uniformly distributing the organo-platinum compound within the solution. Suitable solvents include organic solvents such as, but not limited to, acetone, dichloromethane, toluene, benzene, ethers, and the like.

The organo-platinum compound is associated externally and internally to the zeolite in the treated zeolite. That is, organo-platinum compound is present on the internal and external surfaces of the treated zeolite.

The organo-platinum compound can comprise, consist of, or consist essentially of a platinum-alkyls, a platinum-cycloalkyls, platinum-carboxylates and platinum alkyldiones wherein the alkyl and cycloalkyl groups contain in the range of from 1 to 20 carbon atoms per molecule. The more preferred organo-platinum compounds are platinum (II) acetylacetonate and platinum acetate, with the most preferred being platinum (II) acetylacetonate.

At least a portion, and preferably at least a substantial portion, of the solvent can be removed from the mixture by evaporation. The preferred method is vacuum assisted evaporation at an elevated temperature.

The mixture can be allowed to evaporate at a temperature below the thermal decomposition temperature of the organo-platinum compound. A suitable temperature range is from about 20° C. to about 160° C. preferably from about 30° C. to about 160° C. and most preferably from 50° C. to 150° C.; at a vacuum of less than about 14.7 psia, preferably less than about 1.47 psia, and most preferably less than 0.147 psia; and for a time period sufficient to remove at least a substantial portion of the solvent from the mixture, preferably leaving only the treated zeolite behind.

The treated zeolite is then calcined thereby forming a calcined-treated zeolite. The calcining is performed in the presence of a calcining gas which comprises, consists of, or consists essentially of air. In a preferred embodiment, the calcining gas comprises, consists of, or consists essentially of air and an inert gas selected from the group consisting of nitrogen, argon, helium, and combinations of any two or more thereof.

The calcining step includes heating the treated zeolite in the presence of the calcining gas to a first temperature in the range of from about 100° C. to about 150° C. preferably from about 105° C. to about 140° C., and most preferably from 110° C. to 130° C.; at a pressure in the range of from about 0 psia to about 100 psia, preferably from about 5 psia to about 50 psia, and most preferably from 10 psia to 20 psia; and for a time period in the range of from about 0.1 hour to about 10 hours, preferably from about 1 hour to about 5 hours, and most preferably from 1.5 hours to 2 hours.

The treated zeolite is then heated in the presence of the calcining gas to a second temperature in the range of from about 300° C. to about 360° C., preferably from about 310° C. to about 350° C., and most preferably from 320° C. to 340° C.; at a pressure in the range of from about 0 psia to about 100 psia, preferably from about 5 psia to about 50 psia, and most preferably from 10 psia to 20 psia; and for a time period in the range of from about 0.1 hour to about 10 hours, preferably from about 2 hours to about 6 hours, and most preferably from 3 hours to 5 hours.

The first and second temperatures of the treated zeolite during calcining are preferably maintained by adjusting the concentration of oxygen in the calcining gas. As the temperature of the treated zeolite begins to rise above the desired level, due to the oxidation reaction of the oxygen in the air with the organic ligand (the organo moiety) on the organo-platinum compound in the treated zeolite, the concentration of oxygen can be lowered by adding more of the inert gas to the calcining gas. This serves to slow the oxidation of the organic ligand and, thus, reduces the amount of heat released by this exothermic oxidation reaction. Regardless of the method employed, the first and second temperatures of the treated zeolite must be kept within their desired ranges during the calcining step.

The weight percent of platinum, on an elemental basis, contained in the calcined-treated zeolite is preferably in the range of from about 0.01 wt. % to about 5.0 wt. %, more preferably from about 0.2 wt. % to about 1.3 wt. %, and most preferably from 0.5 wt. % to 1.1 wt. %, based on the total weight of the calcined-treated zeolite.

Any suitable hydrocarbon feed which comprises paraffins (alkanes) and/or olefins (alkenes) and/or naphthenes (cycloalkanes), wherein each of these hydrocarbons contains from 5 to 8 carbon atoms per molecule, can be used as a feed to be contacted with the inventive catalyst composition under suitable process conditions for obtaining a reaction product comprising aromatics. Frequently, these feedstocks also contain aromatic hydrocarbons. Non-limiting examples of suitable, available feedstocks include gasolines from catalytic oil cracking (e.g., FCC and hydrocracking) processes, pyrolysis gasolines from thermal hydrocarbon (e.g., ethane, propane, and naphtha) cracking processes, naphthas, gas oils, reformates, straight-run gasoline and the like. The preferred hydrocarbon feed is a gasoline-boiling range light naphtha hydrocarbon feed suitable for use as at least a gasoline blend stock and generally having a boiling range of about 30° C. to about 210° C. Generally, the content of paraffins exceeds the combined content of olefins, naphthenes and aromatics (if present).

The hydrocarbon feed can be contacted in any suitable manner with the inventive catalyst compositions described herein contained within a conversion reaction zone. The contacting step can be operated as a batch process step or, preferably, as a continuous process step. In the latter operation, a solid catalyst bed or a moving catalyst bed or a fluidized catalyst bed can be employed. Any of these operational modes has advantages and disadvantages, and those skilled in the art can select the one most suitable for a particular feed and catalyst.

The contacting step is preferably carried out within a conversion reaction zone, wherein is contained the inventive catalyst composition, and under conversion conditions that suitably promote the formation of aromatics, preferably benzene, toluene, and xylenes (BTX), from at least a portion of the hydrocarbons of the hydrocarbon feed. The reaction temperature of the contacting step is generally in the range of from about 400° C. to about 800° C. preferably, from about 450° C. to about 750° C. and, most preferably, from 500° C. to about 600° C. The contacting pressure can range from subatmospheric pressure upwardly to about 500 psia, preferably, from about atmospheric pressure to about 450 psia and, most preferably, from 50 psia to 200 psia.

The flow rate at which the hydrocarbon feed is charged to the conversion reaction zone is such as to provide a weight hourly space velocity ("WHSV") in the range of from about 0.1 hour$^{-1}$ to about 100 hour$^{-1}$. The term "weight hourly space velocity", as used herein, shall mean the numerical ratio of the rate at which a hydrocarbon feed is charged to the conversion reaction zone in pounds per hour divided by the pounds of catalyst contained in the conversion reaction zone to which the hydrocarbon is charged. The preferred WHSV of the feed to the conversion reaction zone can be in the range of from about 0.25 hour$^{-1}$ to about 20 hour$^{-1}$ and, most preferably, from 0.5 hours$^{-1}$ to 10 hour$^{-1}$.

The following examples are presented to further illustrate this invention and are not to be construed as unduly limiting its scope.

EXAMPLE I

This example illustrates the preparation of catalysts which were subsequently tested as catalysts in the conversion of a hydrocarbon feed to aromatics (BTX).

Catalyst A (Invention)

A 7.6 gram quantity of KL zeolite obtained from Tosoh Corporation, Japan, under product designation HSZ-500KOA, which had been calcined at 350° C. for 5 hours, was physically mixed with a solution containing 154 mg of platinum acetylacetonate (Pt (acac)$_2$) dissolved in 118.45 mL (93.7 grams) of acetone. The mixture was stirred for 40 hours. The acetone was then slowly removed by evaporation under vacuum over a 40 hour period. The dry catalyst was then placed in a calcining tube for calcination. Air was purged through the calcining tube during the calcination and the catalyst was heated to a temperature of about 150° C., and held there for 2 hours. The catalyst temperature was then ramped to about 250° C. and held there for 2 hours. The catalyst temperature was then ramped to about 360° C. and held there for 1 hour. Catalyst A contains about 1 weight % Pt, based on the total weight of Catalyst A.

Catalyst B (Invention)

A 119.5 gram quantity of KL zeolite obtained from Tosoh Corporation, Japan, under product designation HSZ-500KOA, which had been calcined at 350° C. for 5 hours, was physically mixed with a solution containing 2.43 grams of Pt (acac)$_2$ dissolved in 200 mL (158.2 grams) of acetone. The mixture was stirred for one week. The acetone was then slowly removed by evaporation under vacuum over a 24 hour period. Heat was applied to remove any residual solvent. The dry catalyst was ground until fine and then placed in a calcining tube for calcination. A mixture of nitrogen/air at an 8:1 volumetric ratio was purged through the calcining tube during calcination and the catalyst was heated to a temperature of about 90° C. and held there for 2 hours. The catalyst temperature was then ramped to 170° C. and held there for 2 hours. During ramping to 170° C., the catalyst temperature rose sharply to around 200° C. at which time the air flow was decreased so as to slow the exothermic reaction of the organic ligand of the Pt(acac)$_2$ with oxygen in the air, thus quickly lowering the catalyst temperature to 150° C. at which point the ramping to 170° C. continued. The catalyst temperature was then increased from 170° C. to 300° C. and held there for 2 hours. Catalyst B contains about 1 weight % Pt, based on the total weight of Catalyst B.

Catalyst C (Control)

An 11.59 gram quantity of KL zeolite obtained from Tosoh Corporation, Japan under product designation HSZ-500KOA, which had been calcined at 360° C. for 5 hours, was physically mixed with 234 mg of Pt $(acac)_2$ solid in a round bottom flask. Two thermocouples were placed in the top and bottom of the flask, respectively, to monitor the temperature. The air in the flask containing the mixture was evacuated under vacuum (at around 25 millitorr). The flask was then closed to the vacuum and the flask was left at room temperature for 2 hours. The temperature of the flask was raised to about 100° C. over 1 hour, then lowered to about 90° C. and held there for 2 hours, and then ramped to about 150° C. and held there for 2 hours. The dry catalyst was then placed in a calcining tube for calcination. Air was purged through the calcining tube during the calcination and the catalyst was heated to a temperature of about 225° C. and held there for 1 hour, and then ramped to 350° C. and held there for 45 minutes. Catalyst C contains about 1 weight % Pt, based on the total weight of Catalyst C.

Catalyst D (Control)

Control Catalyst D was made per the method described in U.S. Pat. No. 4,912,072, col. 4, lines 37–55. A 15 gram quantity of KL zeolite obtained from Tosoh Corporation, Japan under product designation HSZ-500KOA, which had been heated at 120° C. for 48 hours, was mixed with 0.75 gram of Pt $(acac)_2$ and 300 mL (398 grams) of $CH_2Cl_2$. The mixture was allowed to stir in static air for 5 days. The mixture was then filtered to remove $CH_2Cl_2$ and washed 3 times with 350 mL quantities of $CH_2Cl_2$. In each washing the catalyst was stirred for one hour with 350 mL of $CH_2Cl_2$. The resulting catalyst was placed in a drying oven at 120° C. for 16 hours. The catalyst was placed in a calcining tube for calcination. Air was purged through the calcining tube during calcination and the catalyst was heated to a temperature of about 110° C. and held there for 1 hour, then ramped to about 210° C. and held there for 2 hours, and then ramped to about 340° C. and held there for three hours.

Catalyst E (control)

A 5 gram quantity of KL zeolite obtained from Tosoh Corporation, Japan, under product designation HSZ-500KOA, was calcined at 250° C. in the presence of air over a weekend, then at 500° C. for 2 hours in the presence of air and at 516° C. overnight in the presence of $N_2$. A 0.028 gram quantity of Pt $(NH_3)_4$ $(NO_3)_2$ was dissolved in 2.8 grams of water to form a solution. A 2.03 gram quantity of the calcined KL zeolite was impregnated by incipient wetness with 1.4 grams of the solution. The impregnated zeolite was dried at 110° C. for 1 hour and calcined in air at 328° C. for 2 hours. Catalyst E contains about 0.35 wt. % Pt, based on the total weight of Catalyst E.

EXAMPLE II

This example illustrates the use of the zeolite materials described in Example I as catalysts in the conversion of a hydrocarbon feed to aromatics such as benzene, toluene and xylenes.

Run 1

A 400 mg quantity of Catalyst A from Example I was placed in a quartz tube reactor. A flow of nitrogen gas at 70 cc/min was passed over the catalyst at atmospheric pressure and the catalyst was heated to 200° C. and held there for 2 hours at which time the nitrogen flow was stopped and a hydrogen flow started at 100 cc/min. After 2 hours, the catalyst temperature was raised to 400° C. and held there for 1 hour. The furnace was turned off and the catalyst was left under a 56 cc/min flow of hydrogen for the next 2 days (weekend). The catalyst in the reactor was then heated to 200° C. under a 100 cc/min flow of nitrogen and held there for 2 hours. The feed gas was switched from nitrogen to hydrogen at a flow rate of 100 cc/min and the catalyst temperature was raised to 400° C., held there for 2 hours, and then raised to 540° C. Light naphtha feed was introduced to the reactor at a flow rate of 0.1 mL/min. for the first 40 hours on stream and was lowered to 0.05 mL/min. thereafter. The catalyst temperature over the length of the run ranged from about 495 ° C. to about 517° C. The reactor was operated under these conditions over several days, with occasional shut downs at the end of a work day, for a total time on stream at these conditions of about 230 hours. The formed reactor product was analyzed periodically using an online gas chromatograph. Test results for Run 1 are summarized in FIG. 1.

Run 2

A 420 mg quantity of Catalyst B from Example I was placed in a quartz tube reactor. A flow of hydrogen gas at 150 cc/min was passed over the catalyst while the catalyst was heated to 200° C. at atmospheric pressure, held there for 30 minutes, then heated to 500° C., held there for 30 minutes, and then increased to 540° C. The hydrogen flow rate was decreased to 101 cc/min and a light naphtha feed was introduced to the reactor at a flow rate of 0.05 mL/min. The catalyst temperature over the length of the run ranged from about 508° C. to about 511° C. The reactor was operated under these conditions over several days, with occasional shut downs at the end of a work day, for a total time on stream at these conditions of about 111 hours. The formed reactor product was analyzed periodically using an online gas chromatograph. Test results for Run 2 are summarized in FIG. 2.

Run 3

A 340 mg quantity of Catalyst A from Example I was placed in a quartz tube reactor. A flow of hydrogen gas at 220 cc/min was passed over the catalyst while the catalyst was heated to 500° C. at atmospheric pressure and held there for 1 hour. A n-hexane feed was introduced to the reactor at a flow rate of 0.05 mL/min and the hydrogen flow rate was lowered to 55 cc/min. The catalyst temperature over the length of the run ranged from about 477° C. to about 482° C. The reactor was operated under these conditions over several days, with occasional shut downs at the end of a work day, for a total time on stream at these conditions of about 54 hours. The formed reactor product was analyzed periodically using an online gas chromatograph. Test results for Run 3 are summarized in FIG. 3.

Run 4

A 320 mg quantity of Catalyst C from Example I was placed in a quartz tube reactor. A flow of hydrogen gas at 250 cc/min was passed over the catalyst while the catalyst was heated to 250° C. at atmospheric pressure and held there for 45 minutes. The reactor was then heated to 500° C. and after 15 minutes the hydrogen flow rate was reduced to 55 cc/min and a n-hexane feed was introduced to the reactor at a flow rate of 0.05 mL/min. The catalyst temperature over the length of the run was about 500° C. The reactor was operated under these conditions over several days, with occasional shut downs at the end of a work day, for a total time on stream at these conditions of about 37 hours. The formed reactor product was analyzed periodically using an online gas chromatograph. Test results for Run 4 are summarized in FIG. 4.

Run 5

A 440 mg quantity of Catalyst D from Example I was placed in a quartz tube reactor. A flow of hydrogen gas at 200 cc/min was passed over the catalyst while the catalyst was heated to a temperature of about 540° C. at atmospheric pressure and held there for 2 hours. A n-hexane feed was introduced to the reactor at a flow rate of 0.05 mL/min. The catalyst temperature over the length of the run ranged from about 500° C. to about 501° C. The reactor was operated under these conditions over several days, with occasional shut downs at the end of a work day, for a total time on stream at these conditions of about 21 hours. The formed reactor product was analyzed periodically using an online gas chromatograph. Test results for Run 5 are summarized in FIG. 5.

Run 6

A 320 mg quantity of Catalyst E from Example I was placed in a quartz tube reactor. A flow of hydrogen gas at 250 cc/min was passed over the catalyst while the catalyst was heated to 200° C. at atmospheric pressure, held there for 1 hour, ramped to 500° C. and held there for 1 hour. The catalyst was then allowed to cool to room temperature and was left that way overnight. The catalyst was then heated to 500° C. and a flow of hydrogen gas at 55 cc/min was passed over the catalyst. A n-hexane feed was introduced to the reactor at a flow rate of 0.05 mL/min. The catalyst temperature over the length of the run was about 500° C. The reactor was operated under these conditions over several days, with occasional shut downs at the end of a work day, for a total time on stream at these conditions of about 19 hours. The formed reactor product was analyzed periodically using an online gas chromatograph. Test results for Run 6 are summarized in FIG. 6.

Figure 2:
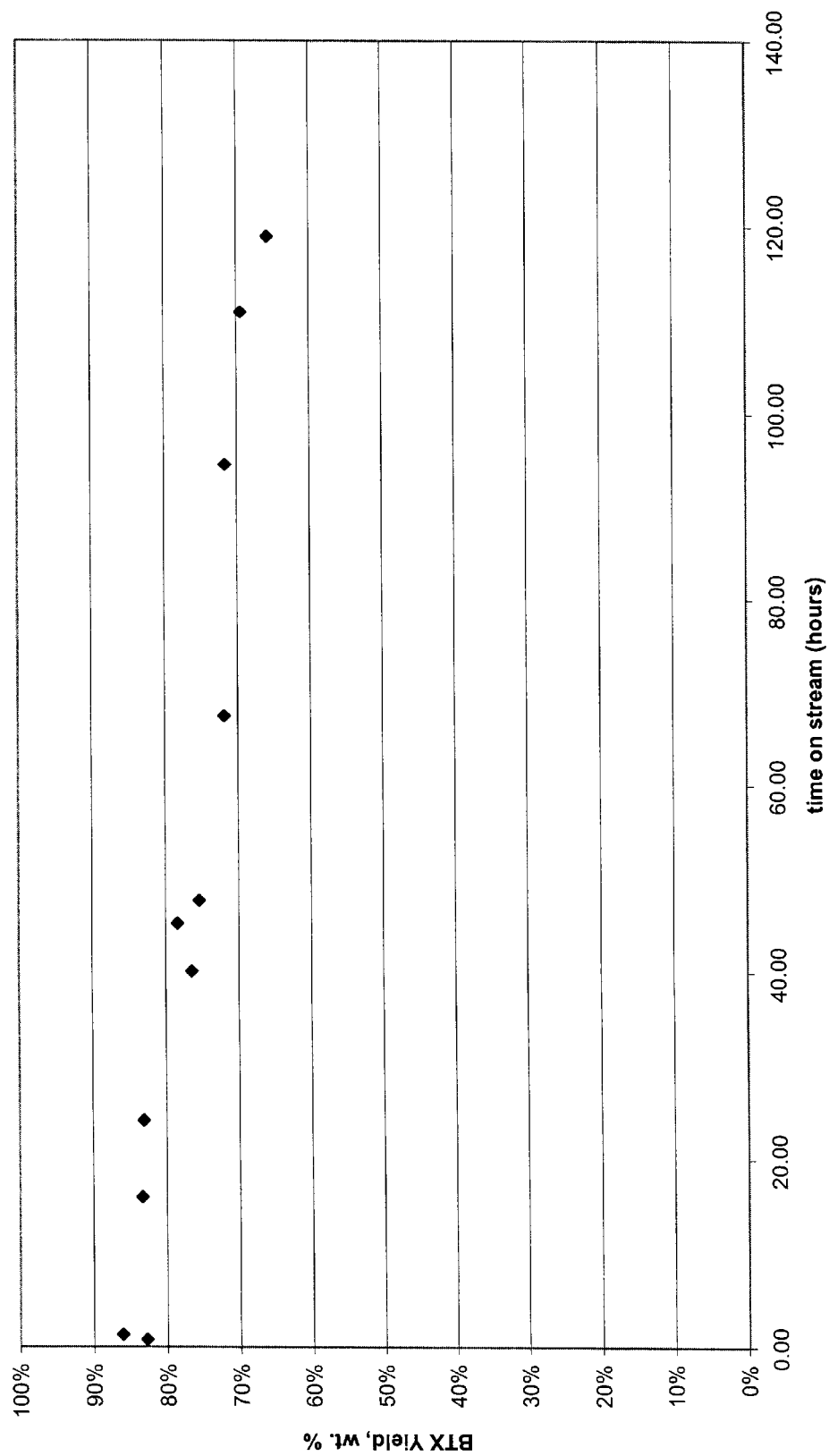

As shown in FIG. 1 (inventive Run 1), inventive Catalyst A demonstrated significant conversion of light naphtha to BTX, ranging from just over 70 wt. % to just under 30 wt. % BTX yield. As shown in FIG. 2 (inventive Run 2), inventive Catalyst B, which had a lower first calcination temperature than inventive Catalyst A, demonstrated even more significant conversion of light naphtha as compared to inventive Catalyst A. The yield of BTX for inventive Run 2 ranged from about 85 wt. % to about 65 wt. %.

Figure 3:
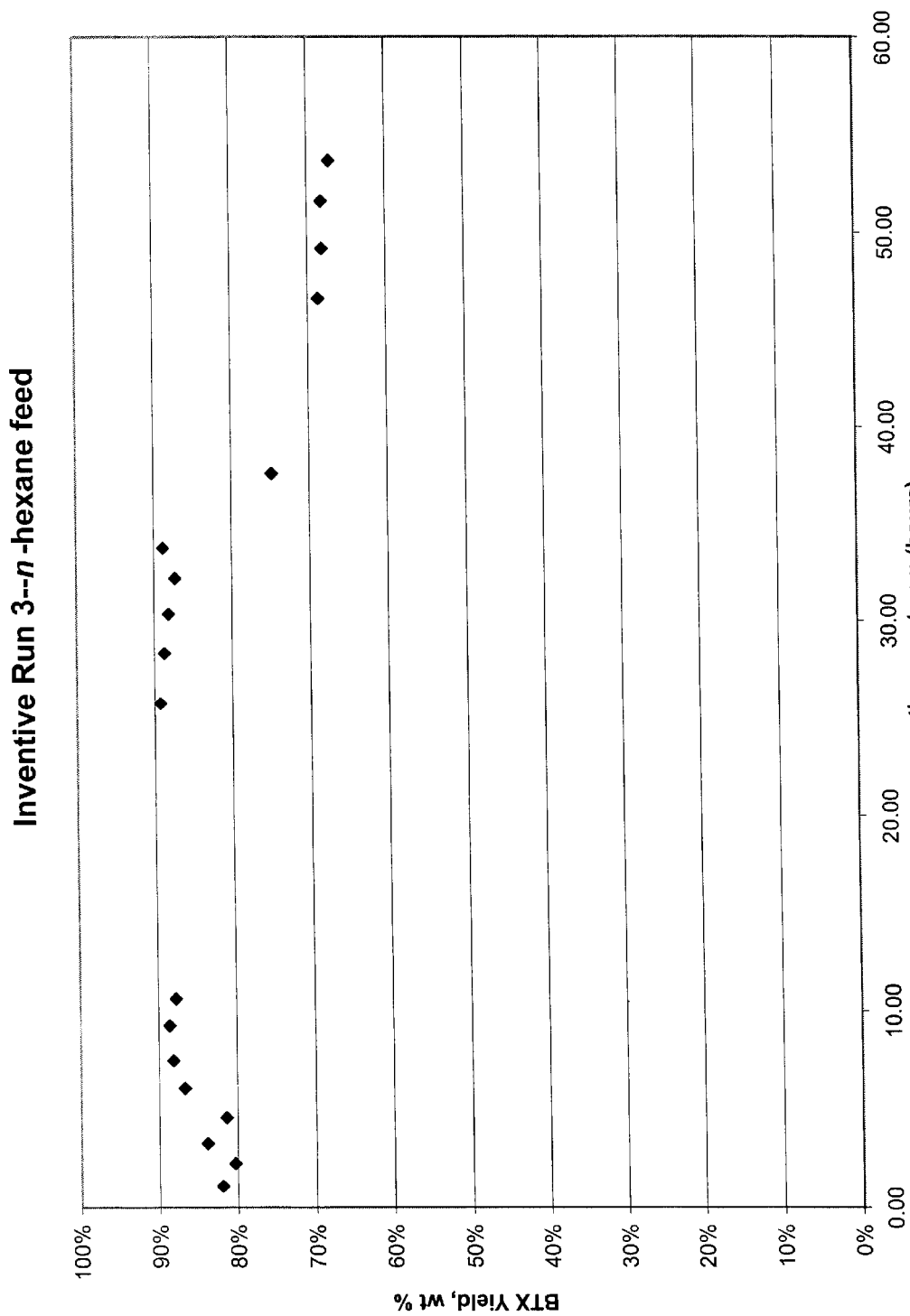

As shown in FIG. 3 (inventive Run 3), inventive Catalyst A demonstrated very significant conversion of n-hexane to BTX, ranging from just under 90 wt. % to just under 70 wt. % BTX yield.

Figure 4:
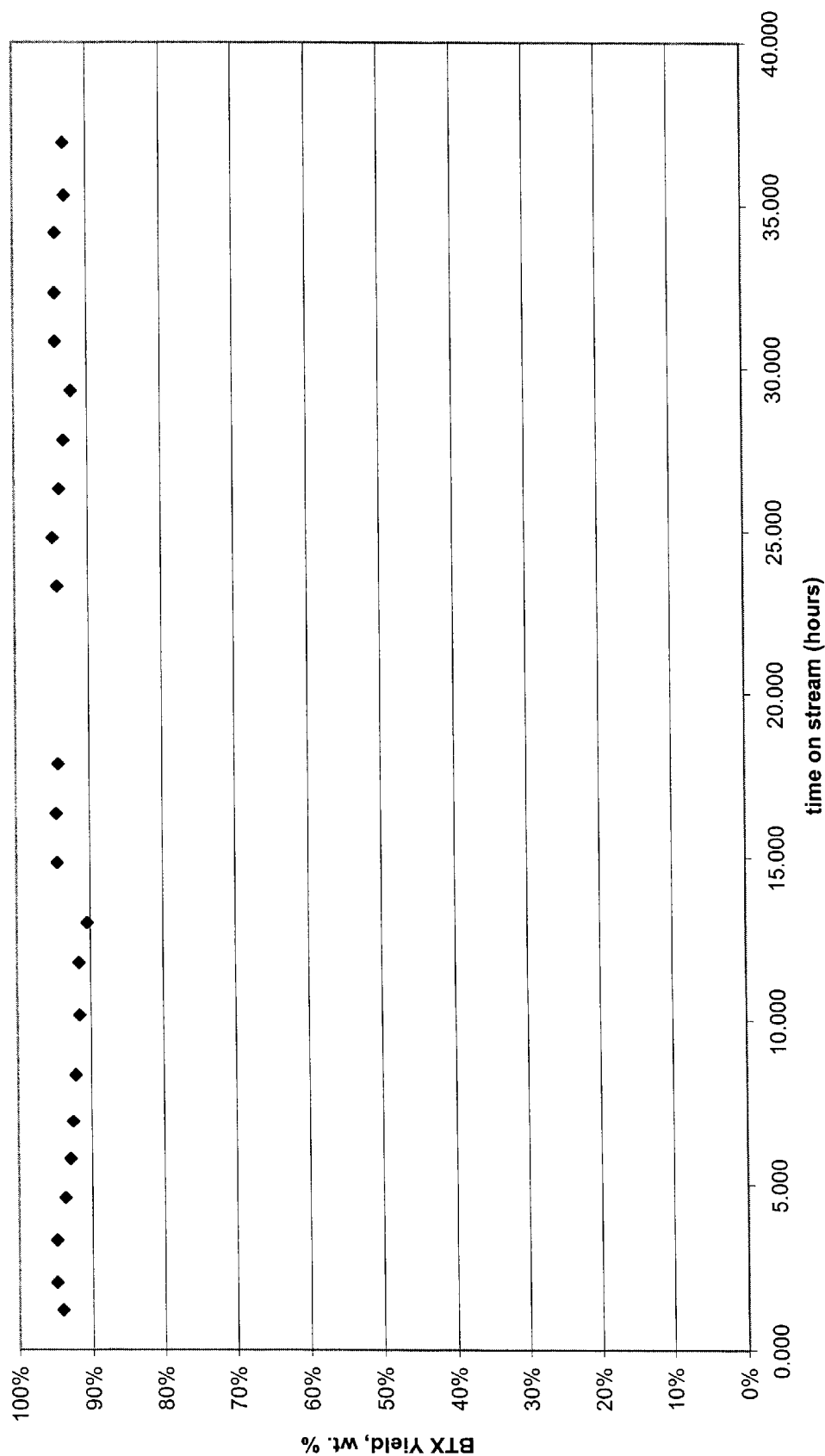
Figure 5:
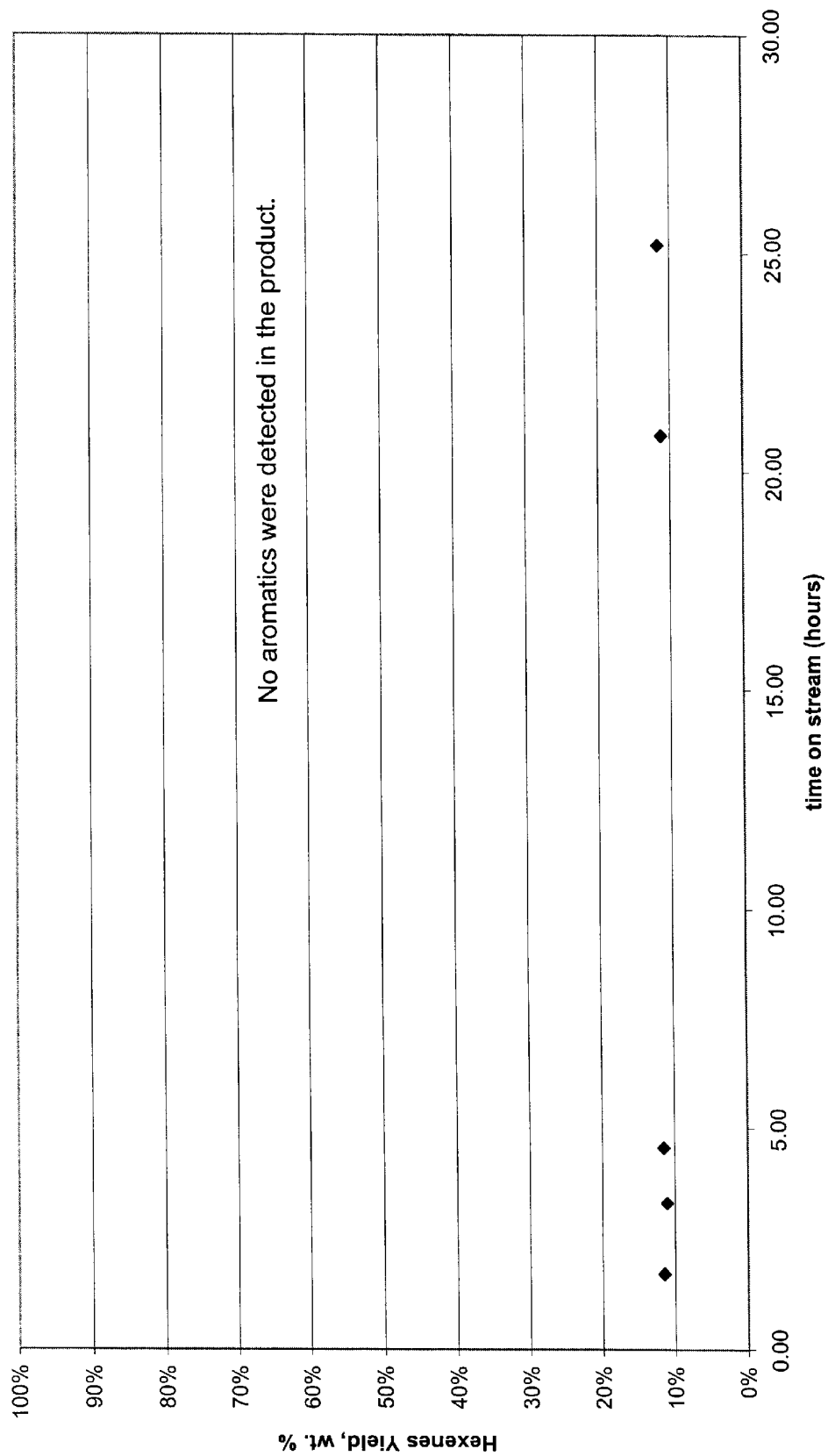

As shown in FIG. 4 (control Run 4), control Catalyst C demonstrated higher conversions of n-hexane to BTX as compared to inventive Catalyst A, ranging from about 95 wt. % to about 90 wt. %. However, control Catalyst C is extremely expensive to prepare (vapor-phase impregnation of Pt (acac)$_2$ into the zeolite) and the increase in BTX yield from using control Catalyst C over inventive Catalyst A, which ranges from about a 20 wt. % to about a 25 wt. % increase in BTX yield, does not offset the added expense of preparing control Catalyst C as compared to the expense of preparing inventive Catalyst A. As shown in FIG. 5 (control Run 5), control Catalyst D produced no aromatics (BTX) and the yield of hexenes was only just over 10 wt. %. Thus, control Catalyst D, which was prepared per the method described in U.S. Pat. No. 4,912,072, col. 4, lines 37–55, was ineffective in the conversion of n-hexane to BTX.

As is evident from comparing FIG. 3 (inventive Run 3) with FIG. 6 (control Run 6), inventive Catalyst A demonstrated a significant increase in BTX yield over control Catalyst E, the increase in BTX yield being in the range of from about 55 wt. % to about 75 wt. %. Thus control Catalyst E, prepared by incipient wetness impregnation of KL zeolite with Pt, is not nearly as effective in the conversion of n-hexane to BTX as compared to inventive Catalyst A.

From the data presented in FIG.'s 1–6 and the above discussion, it is readily apparent that the inventive catalyst compositions demonstrate BTX yield and/or economic advantages over control Catalysts C, D and E.

Reasonable variations, modifications, and adaptations can be made within the scope of the disclosure and the appended claims without departing from the scope of this invention.

That which is claimed is:

1. A method of preparing a catalyst composition comprising the steps of:
   contacting a zeolite with a solution comprising an organic solvent and an organo-platinum compound thereby forming a mixture comprising said solution and a treated zeolite having externally and internally associated organo-platinum compound;
   removing at least a substantial portion of said organic solvent from said mixture by vacuum assisted evaporation at a temperature below the thermal decomposition temperature of said organo-platinum compound thereby leaving said treated zeolite; and
   thereafter, calcining said treated zeolite in the presence of a calcining gas by heating said treated zeolite to a first temperature in the range of from about 100° C. to 150° C. and for a time period in the range of from about 0.1 hour to about 10 hours, followed by heating said treated zeolite to a second temperature in the range of from about 300° C. to about 360° C. and for a time period in the range of from about 0.1 hour to about 10 hours thereby forming a calcined-treated zeolite.

2. A method in accordance with claim 1 wherein said zeolite is KL zeolite.

3. A method in accordance with claim 1 wherein said organic solvent is acetone.

4. A method in accordance with claim 1 wherein said organo-platinum compound is platinum acetylacetonate.

5. A method in accordance with claim 1 wherein the weight percent of platinum contained in said calcined-treated zeolite is in the range of from about 0.01 wt. % to about 5.0 wt. %, based on the total weight of said calcined-treated zeolite.

6. A method in accordance with claim 1 wherein the weight percent of platinum contained in said calcined-treated zeolite is in the range of from about 0.2 wt. % to about 1.3 wt. %, based on the total weight of said calcined-treated zeolite.

7. A method in accordance with claim 1 wherein the weight percent of platinum contained in said calcined-treated zeolite is in the range of from 0.5 wt. % to 1.1 wt. %, based on the total weight of said calcined-treated zeolite.

8. A method in accordance with claim 1 wherein said calcining gas comprises oxygen.

9. A method in accordance with claim 1 wherein said calcining gas comprises oxygen and an inert gas selected from the group consisting of nitrogen, argon, helium, and combinations of any two or more thereof.

10. A method in accordance with claim 9 wherein said first temperature and said second temperature of said treated zeolite are maintained by adjusting the concentration of oxygen in said calcining gas.

11. A method in accordance with claim 1 wherein said calcining step is performed in the presence of a calcining gas and includes heating said treated zeolite to a first temperature in the range of from about 105° C. to about 140° C. and for a time period in the range of from about 1 hour to about 5 hours, followed by heating said treated zeolite to a second temperature in the range of from about 310° C. to about 350° C. and for a time period in the range of from about 2 hours to about 6 hours.

12. A method in accordance with claim 11 wherein said calcining gas comprises oxygen.

13. A method in accordance with claim 11 wherein said calcining gas comprises oxygen and an inert gas selected from the group consisting of nitrogen, argon, helium, and combinations of any two or more thereof.

14. A method in accordance with claim 13 wherein said first temperature and said second temperature of said treated zeolite are maintained by adjusting the concentration of oxygen in said calcining gas.

15. A method in accordance with claim 1 wherein said calcining step is performed in the presence of a calcining gas and includes heating said treated zeolite to a first temperature in the range of from 110° C. to 130° C. and for a time period in the range of from 1.5 hours to 2 hours, followed by heating said treated zeolite to a second temperature in the range of from 320° C. to 340° C. and for a time period in the range of from 3 hours to 5 hours.

16. A method in accordance with claim 15 wherein said calcining gas comprises oxygen.

17. A method in accordance with claim 15 wherein said calcining gas comprises oxygen and an inert gas selected from the group consisting of nitrogen, argon, helium, and combinations of any two or more thereof.

18. A method in accordance with claim 17 wherein said first temperature and said second temperature of said treated zeolite are maintained by adjusting the concentration of oxygen in said calcining gas.

19. A process comprising contacting, under aromatization conditions, a hydrocarbon feed comprising at least one hydrocarbon having in the range of from 5 to 8 carbon atoms per molecule with a catalyst composition prepared by the method of claim 1 to thereby produce a conversion product comprising aromatics.

20. A process in accordance with claim 19 wherein said hydrocarbon feed comprises at least one hydrocarbon selected from the group consisting of alkanes, olefins, cycloalkanes, and combinations of any two or more thereof.

21. A process in accordance with claim 19 wherein said hydrocarbon feed is light naphtha.

22. A process in accordance with claim 19 wherein said conversion conditions include a temperature in the range of from about 400° C. to about 800° C., a contacting pressure in the range of from about subatmospheric to about 500 psia, and a charge rate of said hydrocarbon feed such that the weight hourly space velocity is in the range of from about 0.1 $hour^{-1}$ to about 100 $hour^{-1}$.

23. A process comprising contacting under aromatization conditions, a hydrocarbon feed comprising at least one hydrocarbon having in the range of from 5 to 8 carbon atoms per molecule with a catalyst composition prepared by the method of claim 2 to thereby produce a conversion product comprising aromatics.

24. A process comprising contacting, under aromatization conditions, a hydrocarbon feed comprising at least one hydrocarbon having in the range of from 5 to 8 carbon atoms per molecule with a catalyst composition prepared by the method of claim 3 to thereby produce a conversion product comprising aromatics.

25. A process comprising contacting, under aromatization conditions, a hydrocarbon feed comprising at least one hydrocarbon having in the range of from 5 to 8 carbon atoms per molecule with a catalyst composition prepared by the method of claim 4 to thereby produce a conversion product comprising aromatics.

26. A process comprising contacting, under aromatization conditions, a hydrocarbon feed comprising at least one hydrocarbon having in the range of from 5 to 8 carbon atoms per molecule with a catalyst composition prepared by the method of claim 5 to thereby produce a conversion product comprising aromatics.

27. A process comprising contacting, under aromatization conditions, a hydrocarbon feed comprising at least one hydrocarbon having in the range of from 5 to 8 carbon atoms per molecule with a catalyst composition prepared by the method of claim 8 to thereby produce a conversion product comprising aromatics.

28. A process comprising contacting, under aromatization conditions, a hydrocarbon feed comprising at least one hydrocarbon having in the range of from 5 to 8 carbon atoms per molecule with a catalyst composition prepared by the method of claim 9 to thereby produce a conversion product comprising aromatics.

29. A process comprising contacting, under aromatization conditions, a hydrocarbon feed comprising at least one hydrocarbon having in the range of from 5 to 8 carbon atoms per molecule with a catalyst composition prepared by the method of claim 10 to thereby produce a conversion product comprising aromatics.

* * * * *